United States Patent [19]

Chaverot et al.

[11] Patent Number: 5,382,612

[45] Date of Patent: Jan. 17, 1995

[54] PROCESS FOR PREPARING IN AQUEOUS EMULSION A BITUMEN/POLYMER BINDER WITH CONTINUOUS THREE-DIMENSIONAL POLYMERIC STRUCTURE AND APPLICATION OF THIS BINDER TO THE PRODUCTION OF FACINGS OR BITUMINOUS MIXES

[75] Inventors: Pierre Chaverot, Oullins; Francis Demangeon, Dardilly, both of France

[73] Assignee: Elf France, Courbevoie, France

[21] Appl. No.: 844,662

[22] PCT Filed: Jul. 18, 1991

[86] PCT No.: PCT/FR91/00594

§ 371 Date: Apr. 8, 1992

§ 102(e) Date: Apr. 8, 1992

[87] PCT Pub. No.: WO92/01752

PCT Pub. Date: Feb. 6, 1992

[30] Foreign Application Priority Data

Jul. 20, 1990 [FR] France .................. 90 09276

[51] Int. Cl.$^6$ ..... C08K 3/20; C08F 2/00; C08L 95/00
[52] U.S. Cl. ........................ 524/60; 524/62; 524/68; 524/420; 524/439; 524/155; 524/705
[58] Field of Search ............ 524/60, 62, 68, 420, 524/439, 155, 705; 526/66

[56] References Cited

U.S. PATENT DOCUMENTS

| | | | |
|---|---|---|---|
| 3,803,066 | 4/1974 | Petrossi | 524/60 |
| 4,018,730 | 4/1977 | McDonald | 524/60 |
| 4,554,313 | 11/1985 | Hagenbach et al. | 524/68 |

*Primary Examiner*—Paul R. Michl
*Assistant Examiner*—LaVonda DeWitt
*Attorney, Agent, or Firm*—Burgess, Ryan & Wayne

[57] ABSTRACT

A process is provided for preparing in aqueous emulsion, a bitumen/polymer binder with a continuous three-dimensional polymeric structure. The process comprises:

a) forming a reaction mixture in an emulsion formation zone by feeding to the zone
  (i) a bitumen-polymer component comprised of a bitumen containing 0.5% to 15%, by weight of the bitumen, of a sulphur-crosslinkable elastomeric polymer, the bitumen/polymer component being in the form of a melt viscosity of not more than 2 Pa.s at the melt temperature,
  (ii) an aqueous phase containing an effective quantity of an emulsifying system, and
  (iii) a crosslinking system donating sulphur in a quantity such as to provide 0.5 to 20% by weight of sulphur relative to the weight of the elastomeric polymer contributed by the bitumen/polymer component, and b) maintaining the reaction mixture in the emulsion formation zone at an appropriate temperature until an aqueous emulsion of bitumen/polymer binder is obtained, in which the polymer of the binder is at least partially crosslinked to a three-dimensional structure.

The bitumen/polymer binder is useful for coating road surfaces.

44 Claims, No Drawings

PROCESS FOR PREPARING IN AQUEOUS EMULSION A BITUMEN/POLYMER BINDER WITH CONTINUOUS THREE-DIMENSIONAL POLYMERIC STRUCTURE AND APPLICATION OF THIS BINDER TO THE PRODUCTION OF FACINGS OR BITUMINOUS MIXES

BACKGROUND OF THE INVENTION

1. Field of the Invention

The invention relates to a process for preparing in aqueous emulsion a bitumen/polymer binder with continuous three-dimensional polymeric structure. It also relates to the application of this binder to the production of facings and in particular of road surfacings, of hot- or cold-poured bituminous mixes or else of waterproof facings.

2. Background of the Invention

The use of bituminous binders either in maintenance facings as a surface coat or as a very thin bituminous mix, or as a thicker structural layer of bituminous mix, is only possible if these binders possess the requisite properties of elasticity and plasticity.

The road binders consisting of conventional bitumens do not retain sufficient elasticity and exhibit a plasticity range which is too narrow. It is known that the characteristics of such road binders can be greatly improved by incorporating into them a polymer of elastomeric type which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and of a conjugated diene, the modified binders thus obtained being commonly referred to as bitumen/polymer binders.

The following quantities are generally used for characterizing the properties of bituminous binders:
  penetration, expressed in tenths of a millimeter and determined according to NF standard T 66004,
  ring and ball softening point, expressed in ° C. and determined according to NF standard T 66008,
  Fraass brittle point, expressed in ° C. and determined according to IP standard 80/53.

The temperature difference between the Fraass point and the ring and ball softening point defines the plasticity range of the bituminous binder.

Binders of the bitumen/polymer type can additionally be characterized by rheological tensile tests according to NF standard T 46002 allowing the following quantities to be determined:
  threshold stress ($\sigma t$), expressed in bars
  threshold elongation ($\epsilon t$), expressed in %
  breaking stress ($\sigma b$), expressed in bars
  elongation at break ($\epsilon b$), expressed in %

It is known that an increase in the elastic properties of bituminous binders results in an improvement in the plucking strength of the granulates of the surface coatings and an improvement in the fatigue cracking resistance or the thermal shrinkage cracking resistance of the mixes. In addition, a ring and ball softening point value of the binder which is higher than the maximum temperatures (approximately 60° C. to 70° C.) encountered on the carriageway makes it possible to combat effectively the continuous creep resulting in the rutting of the mixes, and the rising of the binders onto the surface coatings, resulting in the phenomenon of bleeding.

The first two points referred to are very important where economics are concerned, because they are at the source of the deterioration of the structure and of the load-carrying quality of the carriageway. The two latter points are themselves related to the important problem of safety, related to the surface roughness and to the surface uniformity of the surfacing.

The bituminous binders, even of the bitumen/polymer type, which are employed at the present time in road applications do not have the optimum characteristics which would make it possible to meet the above-mentioned requirements.

It is known to produce bituminous binders exhibiting such optimum characteristics for waterproofing applications, by incorporating a polymer in a quantity of more than 10% by weight into a mixture of directly distilled bitumen and oxidized bitumen. Such bituminous binders employed in the waterproofing industry cannot be employed in road building and road maintenance techniques essentially because their viscosity is too high. It is not possible, in fact, to spread a uniform layer of such a binder to produce a surface coating by relying on currently known spreading techniques for hot applications. Moreover, the formulation of the binder film permitting the coating of granulates in a hot-mixing plant is also not possible, because of the very high viscosity of the binder. Finally, the means for lowering this high viscosity of the binder by emulsification also cannot be envisaged with the technology which permits production rates compatible with the reality of road building and road maintenance.

According to the invention a process has been found which makes it possible to prepare in aqueous emulsion a bituminous binder of the bitumen/polymer type which, on the one hand, has a continuous three-dimensional polymeric structure endowing the binder with high viscosity, elasticity and ring and ball softening point values bringing this binder closer to the bituminous binders produced for use in waterproofing and which, on the other hand, does not exhibit the disadvantages of application of these binders which are employed in waterproofing.

In particular, the improved elastic properties of the bitumen/polymer binder produced according to the invention endow the bituminous mixes manufactured by employing this binder with a markedly improved fatigue strength. In addition, the high value of the ring and ball softening point of the binder permits a considerable reduction in the rutting of carriageways produced from this binder. Finally, the said binder has a very high cohesion which makes it possible to produce surfacings of satisfactory characteristics even with very large particle sizes, for example 10/14 mm, of the granulates used in combination with the binder.

SUMMARY OF THE INVENTION

The process according to the invention for preparing in aqueous emulsion a bitumen/polymer binder with a continuous three-dimensional polymeric structure is characterized in that (i) a bitumen/polymer component consisting of a bitumen containing 0.5% to 15% and preferably 1% to 10%, by weight of the bitumen, of a sulphur-crosslinkable elastomeric polymer, the said component being in the form of a melt at a temperature of between 100° C. and 230° C., preferably between 120° C. and 180° C., and having a viscosity of not more than 2 Pa s at the said temperature, (ii) an aqueous phase containing an effective quantity of an emulsifying system and having a temperature of between 10° C. and 90° C. and preferably between 20° C. and 80° C. and (iii) a crosslinking system donating sulphur in a quantity such as to provide 0.5 to 20% and preferably 1 to 15% by weight of sulphur relative to the weight of the elastomeric polymer contributed by the bitumen/polymer component are brought to a zone for forming an emulsion, the weight ratio of the bitumen/polymer component to the aqueous phase ranging from 30:70 to 85:15 and preferably from 50:50 to 80:20, and the reaction mixture thus formed is maintained in the zone for forming the emulsion at an appropriate temperature of between 50° C. and 160° C. until an aqueous emulsion of bitumen/polymer binder is obtained, in which the polymer of the said binder is at least partially crosslinked to a three-dimensional structure.

If need be, the emulsion produced in the zone for forming an emulsion may be brought into a curing zone whose temperature is maintained between 80° C. and 160° C. and stored in the said zone for a sufficient period for the crosslinking of the polymer of the binder to a continuous three-dimensional structure to be complete.

DESCRIPTION OF THE PREFERRED EMBODIMENTS

The bitumen forming the major part of the bitumen/polymer component is chosen from the various bitumens which have a penetration, determined according to NF standard T 66004, of between 10 and 500 and preferably between 20 and 400. In particular, such bitumens may be directly distilled or vacuum-distilled bitumens or else oxidized or semioxidized bitumens, the said bitumens having a penetration which is within the abovementioned ranges.

The sulphur-vulcanizable elastomeric polymer present in the bitumen/polymer component may be one such as polyisoprene, polynorbornene, polybutadiene, butyl rubber or ethylene/propylene/diene (EPDM) terpolymer. The said elastomeric polymer is advantageously chosen from random or block copolymers of styrene and of a conjugated diene because these copolymers dissolve very easily in bitumens and endow the latter with excellent mechanical and dynamic properties and especially with very good viscoelasticity properties. In particular, the copolymer of styrene and of a conjugated diene is chosen from block copolymers of styrene and butadiene, of styrene and isoprene, of styrene and chloroprene, of styrene and carboxylated butadiene and of styrene and carboxylated isoprene. The copolymer of styrene and of conjugated diene, and in particular each of the abovementioned copolymers, advantageously has a styrene weight content ranging from 5% to 50%. The average viscometric molecular mass of the copolymer of styrene and conjugated diene, and especially that of the copolymers referred to above, may be, for example, between 10,000 and 600,000 and preferably lies between 30,000 and 400,000.

The copolymer of styrene and conjugated diene is preferably chosen from di- or triblock copolymers of styrene and butadiene, of styrene and isoprene, of styrene and carboxylated butadiene or of styrene and carboxylated isoprene which have styrene contents and molecular masses situated in the ranges defined above.

The bitumen/polymer component may also contain 1 to 40% and more particularly 2 to 20%, by weight of the bitumen, of a fluxing agent which may consist, in particular, of a hydrocarbon oil exhibiting a distillation range at atmospheric pressure, determined according to ASTM standard D 86-67, of between 100° C. and 450° C. and more especially lying between 150° C. and 380° C. Such a hydrocarbon oil may be, for example, a petroleum cut of aromatic nature, a petroleum cut of naphthenoaromatic nature, a petroleum cut of naphthenoparaffinic nature, a petroleum cut of paraffinic nature, a coal oil, or an oil of vegetable origin.

The bitumen/polymer component which has the required viscosity may be obtained merely by mixing the appropriate quantity of elastomeric polymer, included within the range defined above, with the bitumen which, for its part, is chosen so as to have a viscosity compatible with the viscosity of the bitumen/polymer component to be produced. The said mixing is carried out by bringing the polymer into contact with the bitumen, the operation being carried out at a suitable temperature between 100° C. and 230° C., so that the bitumen should be in a molten state and being stirred for a sufficient period, generally of the order of some tens of minutes to several hours, to obtain a homogeneous mixture.

The bitumen/polymer component may also be produced by first of all mixing the elastomeric polymer with the bitumen as indicated above and then by incorporating into the said mixture a sulphur-donating vulcanization system in a quantity capable of providing a quantity of elemental or radical sulphur representing 0.5% to 10% and more particularly 1% to 8% of the weight of the polymer employed to produce the bitumen/polymer component and by keeping the whole stirred at a temperature of between 100° C. and 230° C., corresponding, for example, to the temperature at which the polymer is brought into contact with the bitumen, for a sufficient period to form a bitumen/polymer component which has the desired viscosity and in the case of which the elastomeric polymer is fixed to the bitumen.

When a bitumen/polymer component containing a fluxing agent is employed, the latter may be added to the mixture which is made up as shown above from the bitumen, the elastomeric polymer and optionally the vulcanizing system, at any time in the making up of the said mixture, the quantity of fluxing agent being chosen so as to be compatible with the desired final utilization on site. In such an embodiment of the bitumen/polymer component employing a fluxing agent and a sulphur-donating vulcanizing system, the elastomeric polymer and the vulcanizing system are incorporated into the bitumen in the form of a master solution of these products in the fluxing agent and in particular in the hydrocarbon oil defined above as capable of forming the fluxing agent. The master solution may be prepared by bringing into contact the ingredients of which it is made up, namely fluxing agent, elastomeric polymer and vulcanizing system, at temperatures of between 10° C. and 140° C. and preferably between 10° C. and 100° C. for a sufficient time, for example 30 minutes to 120 minutes, to obtain a complete dissolution of the elastomeric polymer and of the vulcanizing system in the fluxing agent. The respective concentrations of the elastomeric polymer and of the vulcanizing system in the master solution may vary quite widely, especially as a function of the nature of the fluxing agent employed to dissolve the polymer and the vulcanizing system. The quantity of polymer can thus advantageously represent 5% to 30% of the weight of the fluxing agent, while the quantity of vulcanizing system is such as to provide a quantity of sulphur representing 0.5 to 10% and preferably 1 to 8% of the weight of the polymer present in the master solution.

To prepare the bitumen/polymer component by employing the master solution, the master solution of the polymer and of the vulcanizing system in the fluxing agent is mixed with the bitumen, the operation being carried out at a temperature of between 100° C. and 230° C. and with stirring, this being done, for example, by adding the master solution to the bitumen which is kept stirred at the chosen temperature between 100° C. and 230° C., and the resulting mixture is then kept stirred at a temperature of between 100° C. and 230° C., for example at the temperature employed to mix the bitumen and the master solution, for a sufficient period to obtain a fluid product of uniform appearance and with a viscosity which is compatible with the final utilization on site, and in which bridging of the polymer chains between each other and/or with the bitumen is produced by means of the vulcanizing system.

The quantity of master solution which is mixed with the bitumen is chosen so as to provide the quantities of polymer and of vulcanizing system which are desired in relation to the bitumen, the said quantities being within the ranges defined above.

The bitumen/polymer component may also contain various additives and especially nitrogen compounds of the amine or amide type as promoters of adhesion of the final bitumen/polymer binder to the mineral surfaces, the said nitrogen compounds being preferably grafted onto the bitumen/polymer component and in particular onto the polymeric chains of the said component.

The sulphur-donating crosslinking system employed in the application of the process according to the invention, just like the sulphur-donating vulcanizing system optionally employed in the preparation of the bitumen/polymer component, may consist of a product chosen from elemental sulphur, hydrocarbyl polysulphides, sulphur-donating vulcanization accelerators and mixtures of such products with each other and/or with vulcanization accelerators which do not donate sulphur. In particular, the sulphur-donating crosslinking or vulcanizing system is chosen from the products M which contain, by weight, from 0% to 100% of a component A consisting of one or more sulphur-donating vulcanization accelerators and from 100% to 0% of a component B consisting of one or more vulcanizing agents chosen from elemental sulphur and hydrocarbyl polysulphides, and the products N, which contain a component C consisting of one or more vulcanization accelerators which do not donate sulphur and a product M in a weight ratio of the component C to the product M ranging from 0.01 to 1 and preferably from 0.05 to 0.5.

The elemental sulphur capable of being employed to form, partially or entirely, the sulphur-donating crosslinking or vulcanizing system is advantageously sulphur in flower form and preferably sulphur crystallized in the orthorhombic form and known by the name of alpha sulphur.

The hydrocarbyl polysulphides capable of being employed to form at least a part of the sulphur-donating crosslinking or vulcanizing system correspond to the general formula

in which each of $R_7$ and $R_8$ denotes a saturated or unsaturated monovalent $C_1$–$C_{20}$ hydrocarbon radical or they are connected together to form a saturated or unsaturated divalent $C_2$–$C_{20}$ hydrocarbon radical forming a ring with the other groups of atoms combined in the formula, $R_9$ is a saturated or unsaturated divalent $C_1$–$C_{20}$ hydrocarbon radical, the —$(S)_v$— units denote divalent groups each made up of v sulphur atoms, it being possible for the vs to be different from one of the said groups to another, and denoting integers ranging from 1 to 6 with at least one of the vs equal to or greater than 2, and w denotes an integer assuming the values from zero to 10.

In the abovementioned formula the monovalent $C_1$–$C_{20}$ hydrocarbon radicals $R_7$ and $R_8$ and the divalent $C_1$–$C_{20}$ hydrocarbon radical $R_9$ are chosen especially from aliphatic, alicyclic or aromatic radicals. When the radicals $R_7$ and $R_8$ are connected together to form a divalent $C_1$–$C_{20}$ hydrocarbon radical forming a ring with the other groups of atoms combined in the formula, the said divalent radical is similar to the radical $R_9$ and may also be of the aliphatic, alicyclic or aromatic type. In particular, the radicals $R_7$ and $R_8$ are identical and chosen from $C_1$–$C_{20}$ alkyl radicals, for example ethyl, propyl, hexyl, octyl, nonyl, decyl, linear dodecyl, tert-dodecyl, hexadecyl, octadecyl and $C_6$–$C_{20}$ cycloalkyl and aryl radicals, especially benzyl, phenyl, tolyl and cyclohexyl, while the radical $R_9$ or the divalent radical formed by the coupling of $R_7$ and $R_8$ are chosen from $C_1$–$C_{20}$ alkylene radicals or $C_6$–$C_{20}$ cycloalkylene or arylene radicals, especially phenylene, tolylene and cyclohexylene.

Polysulphides which can be employed according to the invention are in particular those defined by the formula $R_7$—$(S)_u$—$R_8$ in which each of $R_7$ and $R_8$ denotes a saturated or unsaturated $C_1$–$C_{20}$ monovalent hydrocarbon radical or they are connected together to form a $C_1$–$C_{20}$ divalent radical $R_9$, where $R_7$, $R_8$ and $R_9$ have the above meanings, —$(S)_u$ denotes a divalent group made up of a sequence of u sulphur atoms, u being an integer ranging from 2 to 6.

Preferred polysulphides correspond to the general formula $R_{10}$—$(S)_t$—$R_{10}$ in which $R_{10}$ denotes a $C_6$–$C_{16}$ alkyl radical and —$(S)_t$— denotes a divalent group made up of a sequence of t sulphur atoms, t being an integer ranging from 2 to 5. Examples of such polysulphides are especially dihexyl disulphide, dioctyl disulphide, didodecyl disulphide, di-tert-dodecyl disulphide, dihexadecyl disulphide, dihexyl trisulphide, dioctyl trisulphide, dinonyl trisulphide, di-tert-dodecyl trisulphide, dihexadecyl trisulphide, dihexyl tetrasulphide, dioctyl tetrasulphide, dinonyl tetrasulphide, di-tert-dodecyl tetrasulphide, dihexadecyl tetrasulphide, dihexyl pentasulphide, dioctyl pentasulphide, dinonyl pentasulphide, di-tert-dodecyl pentasulphide and dihexadecyl pentasulphide.

Other polysulphides which may be employed according to the invention are, for example, ones such as diphenyl trisulphide, dibenzyl trisulphide, diphenyl tetrasulphide, ortho-tolyl tetrasulphide, dibenzyl tetrasulphide, dibenzyl pentasulphide, diallyl pentasulphide and tetramethyltetrathiane.

The sulphur-donating vulcanization accelerators may be chosen in particular from thiuram polysulphides of the general formula

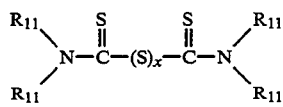

in which each of the $R_{11}$s, which are identical or different, denotes a $C_1$–$C_{12}$ and preferably $C_1$–$C_8$ hydrocarbon radical, especially an alkyl, cycloalkyl or aryl radical, or else two radicals $R_{11}$ attached to the same nitrogen atom are joined together to form a $C_2$–$C_8$ divalent hydrocarbon radical and x is a number ranging from 2 to 8. Examples of such vulcanization accelerators which may be mentioned are especially the compounds: dipentamethylene-thiuram disulphide, dipentamethylenethiuram tetrasulphide, dipentamethylenethiuramhexasulphide, tetrabutylthiuram disulphide, tetraethylthiuram disulphide and tetramethylthiuram disulphide.

As other examples of sulphur-donating vulcanization accelerators there may also be mentioned alkylphenol disulphides and disulphides such as morpholine disulphide and N,N'-caprolactam disulphide.

The vulcanization accelerators which do not donate sulphur may be sulphur compounds chosen especially from mercaptobenzothiazole and its derivatives, dithiocarbamates of general formula (I)

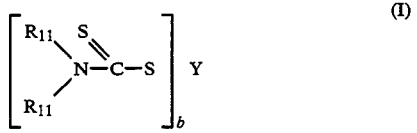

in which the $R_{11}$s, which are identical or different, have the meaning given above, Y denotes a metal and b denotes the valency of Y, and thiuram monosulphides of general formula (II)

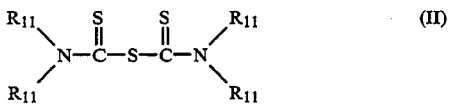

in which the $R_{11}$s, which are identical or different, have the meaning given above.

Examples of vulcanization accelerators of the mercaptobenzothiazole type may be ones such as mercaptobenzothiazole, zinc benzothiazolethiolate, sodium benzothiazolethiolate, benzothiazyl disulphide, copper benzothiazolethiolate, benzothiazyl-N,N'-diethylthiocarbamyl sulphide and benzothiazolesulphenamides such as 2-benzothiazolediethylsulphenamide, 2-benzothiazolepentamethylenesulphenamide, 2-benzothiazolecyclohexylsulphenamide, N-oxydiethylene-2-benzothiazolesulphenamide, N-oxydiethylene-2-benzothiazolethiosulphenamide, 2-benzothiazoledicyclohexylsulphenamide, 2-benzothiazolediisopropylsulphenamide, 2-benzothiazole-tert-butylsulphenamide or N-oxydiethylenethiocarbamyl-N'-oxydiethylenesulphenamide.

Among the vulcanization accelerators of the dithiocarbamate type of general formula (I) there may be mentioned in particular the compounds: bismuth dimethyldithiocarbamate, cadmium diamyldithiocarbamate, cadmium diethyldithiocarbamate, copper dimethyldithiocarbamate, zinc dibutyldithiocarbamate, lead diamyldithiocarbamate, lead dimethyldithiocarbamate, lead pentamethylenedithiocarbamate, selenium dimethyldithiocarbamate, tellurium diethyldithiocarbamate, zinc diamyldithiocarbamate, zinc dibenzyldithiocarbamate, zinc diethyldithiocarbamate, zinc dimethyldithiocarbamate and zinc pentamethylenedithiocarbamate.

As examples of thiuram monosulphides corresponding to formula (II) there may be mentioned compounds such as dipentamethylenethiuram monosulphide, tetrabutylthiuram monosulphide, tetraethylthiuram monosulphide and tetramethylthiurammonosulphide.

Other vulcanization accelerators which do not donate sulphur and which do not belong to the classes defined above may also be employed. Such vulcanization accelerators may be ones such as 1,3-diphenylguanidine, di-ortho-tolylguanidine and zinc oxide, it being possible for the latter compound to be employed optionally in the presence of fatty acids of the stearic acid, ethylcaproic acid or lauric acid type.

The sulphur-donating vulcanization accelerators which can be employed according to the invention are advantageously ones such as tetramethylthiuram disulphide, tetraethylthiuramdisulphide and dipentamethylenethiuramtetrasulphide, and the vulcanization accelerators which do not donate sulphur are ones such as 2-mercaptobenzothiazole, dibenzothiazyl disulphide, zinc benzothiazolethiolate, 2-benzothiazolecyclohexylsulphenamide, N-oxydiethylene-2-benzothiazolesulphenamide, 2-benzothiazolediisopropylsulphenamide, 2-benzothiazoledicyclohexylsulphenamide, zinc dimethyldithiocarbamate, zinc diethyldithiocarbamate, zinc dibutyldithiocarbamate, tetramethylthiurammonosulphide, di-ortho-tolylguanidine, morpholine disulphide and zinc oxide.

As a result of their composition, as indicated above, the crosslinking system, just like the vulcanizing system, may be of the single-component or of the multi-component type, it being possible for the system of the multicomponent type to be made up before it is employed or else produced in situ in the medium in which it must be present. The crosslinking or vulcanizing system of the preformed multicomponent type or of the single-component type or the components of the system of the multicomponent type formed in situ may be employed as they are, for example in the molten state, or else as a mixture, for example in solution or in suspension, with a diluent which may be especially a hydrocarbon compound and, in particular, a hydrocarbon oil of the type of that defined above as capable of forming the fluxing agent or else a bitumen, the said diluent advantageously representing 5 to 45% of the weight of the said mixture.

The aqueous phase which is employed in the application of the process according to the invention consists of water containing an emulsifying system in an effective quantity, that is to say in a quantity capable of permitting the dispersion of the globules of the bitumen/polymer component in the said aqueous phase and of preventing reagglomeration of the said dispersed globules. The quantity of emulsifying system is generally chosen so as to represent 0.005% to 3% and preferably from 0.01% to 2% of the total weight of the emulsion.

The emulsifying system present in the aqueous phase of the emulsion may be of cationic, anionic, nonionic or even amphoteric nature. An emulsifying system of cationic nature, which gives rise to a cationic emulsion, comprises one or more cationic emulsifying agents which may be advantageously chosen from nitrogenous cationic emulsifying agents such as fatty monoamines, polyamines, amidoamines, amidopolyamines, salts or oxides of the said amines and amidoamines, products of reaction of the abovementioned compounds with ethylene oxide and/or propylene oxide, imidazolines and quaternary ammonium salts. In particular, the emulsifying system of cationic nature may be made up of the combination of one or more cationic emulsifying agents A chosen from cationic nitrogenous emulsifying agents such as monoamines, diamines, amidoamines, oxides of such amines or amidoamines, products of reaction of such compounds with ethylene oxide and/or propylene oxide and quaternary ammonium salts, with one or more emulsifying agents B chosen from cationic nitrogenous emulsifying agents containing in their molecule at least three functional groups chosen from amine and amide groups so that at least one of the said functional groups is an amine group, the ratio of the weight quantity of the compound(s) A to the total weight quantity of the compounds A and B ranging in particular from 5% to 95%. An emulsifying system of anionic nature, which gives rise to an anionic emulsion, comprises one or more anionic emulsifying agents which may be chosen especially from the alkali metal or ammonium salts of fatty acids, alkali metal polyalkoxycarboxylates, alkali metal N-acylsarcosinates, alkali metal hydrocarbylsulphonates and especially sodium alkylsulphonates, sodium arylsulphonates and sodium alkylarylsulphonates, sodium alkylarenesulphonates, sodium lignosulphonates, sodium dialkylsulphosuccinates and sodium alkyl sulphates. It is also possible to employ an emulsifying system of nonionic nature, made up of one or a number of nonionic emulsifying agents which may be chosen especially from ethoxylated fatty alcohols, ethoxylated fatty acids, sorbitan esters, ethoxylated sorbitan esters, ethoxylated alkylphenols, ethoxylated fatty amides and glycerine fatty acid esters. It is further possible to employ an emulsifying system of amphoteric nature, made up of one or more amphoteric emulsifying agents which may be chosen, for example, from betaines and amphoteric imidazolinium derivatives. It is also possible to employ an emulsifying system consisting of a mixture of emulsifying agents of different natures, for example a mixture of one or a number of anionic or cationic emulsifying agents with one or a number of nonionic and/or amphoteric emulsifying agents. For further details on the emulsifying agents capable of forming emulsifying systems which can be employed according to the invention, reference may be made to the Kirk-Othmer manual entitled Encyclopedia of Chemical Technology, third edition, volume 22, pages 347 to 360 (anionic emulsifiers), pages 360 to 377 (nonionic emulsifiers), pages 377 to 384 (cationic emulsifiers) and pages 384 to 387 (amphoteric emulsifiers).

The emulsifying system is advantageously chosen from emulsifying systems of anionic nature, the emulsion obtained being an anionic emulsion, or from emulsifying systems of cationic nature, the emulsion obtained being a cationic emulsion.

If need be, an agent intended to adjust the pH of the emulsion to the desired value may also be incorporated in the aqueous phase. The said agent may be an acid, for example an inorganic acid such as HCl, $HNO_3$, $H_3PO_4$ or a saturated or unsaturated mono- or polycarboxylic acid such as acetic acid, formic acid, oxalic acid or citric acid, when the pH value of the emulsion is to be lowered, or a base or a basic salt, especially an inorganic base consisting of an alkali metal hydroxide such as sodium hydroxide or of an alkaline-earth metal oxide or hydroxide, when the pH value of the emulsion is to be raised.

In addition to the emulsifying system and the optional pH adjusting agent the aqueous phase may also contain various additives such as salts, especially sodium chloride or calcium chloride, which in certain cases make it possible to increase the viscosity obtained, adhesion promoters, or even thickening agents which may be ones such as scleroglucan, scleroglucan modified with glyoxal or with another reactant, guar gum, gum arabic, ghatti gum, karaya gum, gum tragacanth, locust bean gum, xanthan gum, or water-soluble polyurethane with a viscometric molecular mass of less than 20,000 resulting in particular from the reaction of one or more polyisocyanates with one or more polyols chosen from polyester polyols and polyether polyols. The quantity of thickening agent present in the aqueous phase is chosen so that it is, for example, between 100 and 5000 ppm by weight of the said phase.

To prepare the aqueous phase which is brought into contact with the bitumen/polymer component and the crosslinking system in the zone for forming the emulsion, the emulsifying system and the optional other ingredients, especially the pH adjusting agent and the thickening agent, are incorporated into the quantity of water needed for the manufacture of the bitumen/polymer binder in emulsion and preheated to a temperature of between 10° C. and 90° C. and preferably between 20° C. and 80° C. The quantity of emulsifying system added to the water is chosen so that the concentration of the said emulsifying system in the final emulsion should lie in the range defined above. When other ingredients, especially the pH adjusting agent, thickening agent and salts, are to be incorporated in the aqueous phase the respective quantities of the said ingredients are those commonly employed for this purpose.

For example, the aqueous phase for producing an anionic emulsion maybe prepared as follows. The appropriate quantity of a precursor of an emulsifying agent of the anionic type, consisting of an acid or polyacid containing a saturated or partially unsaturated or also partially cyclic aliphatic chain is dissolved or dispersed in water maintained at a temperature of between 10° C. and 90° C. and more particularly between 20° C. and 80° C. the operation being carried out with stirring. A concentrated NaOH or KOH solution is then added to the solution or suspension obtained until the neutralisation of the acid and formation of the corresponding salt, which forms the anionic emulsifying agent. The pH of the emulsion may range between 7 and 13 and more especially between 9 and 11. The acidic precursor concentration of the aqueous phase is chosen to represent between 0.02% and 2% of the weight of the final emulsion, depending on the use of the emulsion on the carriageway.

When it is desired to form a cationic emulsion, the aqueous phase may be prepared, for example, as follows. An appropriate quantity of one or a number of cationic emulsifying agents, for example such as fatty amines or polyethylene polyamines containing a fatty chain, is dispersed in water maintained at a temperature of between 10° C. and 90° C. and more particularly between 20° C. and 80° C., and then a sufficient quantity of an inorganic acid or of a monocarboxylic or polycarboxylic organic acid is added to the dispersion to obtain a final pH of between 1 and 7 and preferably between 2 and 5. The concentration of cationic emulsifying agent(s) in the aqueous phase is chosen so as to represent 0.2 to 2% of the weight of the final cationic emulsion.

When additives such as salt, adhesion promoter or thickening agent are employed in any of the examples of preparation of the aqueous phase which are given above, these additives are added to the aqueous phase at any time during the preparation of the latter and in any order.

To prepare the aqueous emulsion of a bitumen/polymer binder with continuous three-dimensional polymeric structure from the bitumen/polymer component, the aqueous phase and the sulphur-donating crosslinking system, the operation is advantageously carried out as follows.

First of all the sulphur-donating crosslinking system or each of the components intended to form the said system in situ is mixed into the bitumen/polymer component in a concentration such as to provide a quantity of sulphur representing 0.5 to 20% and preferably 1 to 15% of the weight of the elastomeric polymer present in the bitumen/polymer component. This mixing may be carried out in separate charges, the sulphur-donating crosslinking system or its components being added to a charge of the bitumen/polymer component which is maintained at a temperature of between 100° C. and 230° C. and preferably between 120° C. and 180° C. in a mechanically stirred vessel which allows rapid homogenization. The said mixing may also be performed continuously by in-line injection of the sulphur-donating crosslinking system or of its components into a stream of the bitumen/polymer component maintained at a temperature of between 100° C. and 230° C. and preferably between 120° C. and 180° C., followed by homogenization of the whole in a static mixer or else in a mechanical in-line mixer.

As soon as the bitumen/polymer component and the sulphur-donating crosslinking system have been mixed, a reaction of crosslinking of the elastomeric polymer by the sulphur provided by the crosslinking system commences, resulting in the formation of a product with continuous three-dimensional polymeric structure, and it is important that the mixture of the bitumen/polymer component and of the crosslinking system should be emulsified immediately or as rapidly as possible after its formation before the viscosity of the said mixture reaches a value preventing this mixture from being conveyed to the zone for forming the emulsion or quite simply from being pumped.

The intimate mixture of the bitumen/polymer component and of the sulphur-donating crosslinking system, which is at a temperature of between 100° C. and 230° C. and preferably between 120° C. and 180° C., which is sufficient for the said mixture to be in the form of a melt, is therefore, substantially immediately after its formation, brought into contact with the aqueous phase which has an appropriate temperature of between 10° C. and 90° C. and preferably between 20° C. and 80° C. and the combination is immediately introduced into the zone for forming the emulsion, consisting of a colloid mill operating at a temperature of between 80° C. and 160° C. In an alternative form, the intimate mixture of the bitumen/polymer component and of the sulphur-donating crosslinking system and the aqueous phase, which are at temperatures such as those mentioned above respectively, are first of all brought into contact in a premixer to produce a predispersion of the two phases, and the resulting predispersion is then brought into the zone for forming the emulsion of the colloid mill type operating at the abovementioned temperature. The colloid mill consists of one or more rotors of the conical, cylindrical or disc-shaped type rotating facing a stator which is conical, cylindrical or disc-shaped respectively and maintained at a distance from the rotor of between 0.01 mm and 3 mm, this distance defining the gap of the colloid mill. The internal architecture of these colloid mills may range from perfectly smooth surfaces to openings made in the stator and the rotor, passing through grooves produced on the rotor and/or on the stator.

When the mixture of the bitumen/polymer component and of the sulphur-donating crosslinking system is at a temperature which, after contact with the aqueous phase, results in a temperature above the boiling temperature of water, the circuit must be maintained under a sufficient pressure to prevent the water from boiling. In this case the emulsion removed from the zone for forming the emulsion must be cooled, for example in an air or water heat exchanger, to a temperature below 100° C. before being returned to atmospheric pressure in order to be directed towards the final storage or else to be charged directly into a spreader lorry.

As indicated above, the emulsion originating from the zone for forming the emulsion may be advantageously kept in a curing zone at a temperature of between 80° C. and 160° C. and for a sufficient period for the reaction of crosslinking by sulphur, which takes place within the globules of the bitumen/polymer component dispersed in the aqueous phase, to be complete. When the sulphur-donating crosslinking system does not contain any crosslinking accelerator, the emulsion originating from the zone for forming the emulsion is kept in the curing zone at a temperature which is preferably between 100° C. and 160° and more particularly between 100° C. and 120° C. for a period ranging from 15 minutes to 2 hours. When the crosslinking system contains a crosslinking accelerator, the emulsion originating from the zone for forming the emulsion is kept in the curing zone at a temperature which is preferably between 80° C. and 100° C. and more especially between 85° C. and 95° C. for a period ranging from 15 minutes to 4 hours.

Breaking of the emulsion obtained by the process according to the invention, that is to say coalescing of the globules of the bitumen/polymer binder of continuous three-dimensional polymeric structure suspended in the aqueous phase, produces a continuous phase exhibiting the elasticity, cohesion and adhesiveness properties of the bitumen/polymer binder suspended in the aqueous phase. As for the aqueous phase, this is removed either mechanically or by evaporation.

The bitumen/polymer binder emulsion obtained by the process according to the invention can be employed for the production of facings and especially of road facings of the surfacing type, for the production of hot- or cold-poured bitumen mixes or for the production of waterproofing facings.

With a view to use as a surface coating, the emulsifier of the aqueous phase which is chosen is an emulsifier permitting a rapid breaking of the emulsion, which results in the restoration of a binder which adheres both to the carriageway and to the granulates and whose ring and ball softening point and adhesiveness characteristics will permit the granulates to be maintained at the surface of the carriageway, particularly under the effect of the tangential stresses resulting from the movement of tires over the surface of the coating, the high ring and ball softening point of the bitumen/polymer binder making it possible effectively to prevent the bleeding phenomena which can appear with heavy traffic on soft substrates with polymer-modified or unmodified conventional bituminous binders.

If the final objective of the use of the emulsion is the pouring of a bituminous mix, the operation can be carried out either cold by spreading with the aid of a finisher of the granulate/emulsion mix prepared in a mixing plant, followed by compaction of the said mix using smooth rollers and/or using pneumatic-tired rollers, or hot by blending the emulsion with the hot granulates until the water has completely evaporated, followed by spreading with the aid of a finisher of the bituminous mix prepared in a mixing plant, followed by compaction of the said bituminous mix using smooth rollers and/or pneumatic-tired rollers. Under the effect of the shearing due to the compaction and of the evaporation of the water resulting from the spreading of the emulsion into a very thin film, the said emulsion will restore a bitumen/polymer binder having the properties described above.

In the above cases the high ring and ball softening point of the binder according to the invention will result in an increased resistance to rutting, and the cohesiveness of the said binder will be reflected in a good resistance of the structure to cracking due to fatigue and to thermal shrinkage.

The emulsion obtained by the process according to the invention can also be introduced hot into a mixing plant where the granulates, heated and dried beforehand, are blended with the said emulsion, and this results the evaporation of the water present in the emulsion under the effect of heat. The binder restored after the breaking of the emulsion and the removal of water exhibits the already indicated properties of cohesiveness, elasticity and ring and ball softening point.

The emulsion prepared by the process according the invention can further be employed in the cold-poured bituminous mix technique. In this case the composition of the aqueous phase is adapted, as is known in the art, to permit breaking of the slurry after its blending and is spreading on the carriageway. As a result of the high cohesiveness of the binder obtained according to the invention and its high ring and ball softening point, such a technique can be advantageously employed on carriageways carrying heavy traffic, as can be the case with carriageways in an urban environment.

The invention is illustrated by the following examples, given without any limitation being implied.

In these examples quantities and percentages are expressed by weight unless stated otherwise.

EXAMPLE 1

Two emulsions of a bitumen/polymer binder were prepared, one (test 1A) by making use of the process according to the invention and the other (test 1B), forming a control emulsion, by proceeding in a conventional manner.

Test 1A (Reparation of the Emulsion According to the Invention)

In an operation carried out at 170° C. and with stirring, 1000 parts of a directly distilled bitumen which had a penetration, expressed in tenths of a millimeter, of 80.3, a ring and ball softening point of 40.6° C., a Fraass point of $-17°$ C. and a kinematic viscosity at 160° C. of $1.5 \times 10^{-4}$ m$^2$/s were mixed with 31 parts of a diblock copolymer of styrene and butadiene exhibiting a viscometric average molecular mass of approximately 90,000 and containing 23% of styrene. After 2.5 hours' mixing, a vulcanizing system was added to the homogeneous mass thus obtained, consisting of one part of crystallized sulphur, and the whole was kept stirred at a temperature of 170° C. for a further 90 minutes, to obtain a bitumen/polymer component which had a viscosity of 0.35 Pa s at 160° C.

10 parts of crystallized sulphur were incorporated as a sulphur-donating crosslinking system into 1000 parts of the bitumen/polymer component produced as indicated above and maintained at 170° C., and the whole was stirred at the said temperature until a homogeneous mix was obtained.

In parallel, 4 parts of an emulsifying system consisting of a fatty polyamine of the polypropylenediamine type were introduced with stirring into 430 parts of water maintained at 50° C. until the said emulsifier was completely dispersed. The suspension thus obtained was neutralized with 2.5 parts of concentrated hydrochloric acid, the whole being kept vigorously stirred at a temperature of 50° C. The resulting preparation constituted the aqueous phase employed to form the emulsion.

Immediately after the formation of the homogeneous mixture of the bitumen/polymer component and of the crosslinking system consisting of crystallized sulphur, 1000 parts of the said mixture, at a temperature of 170° C. were brought into contact with 430 parts aqueous phase at 50° C. and the whole was introduced, immediately after being brought into contact, into a zone for forming an emulsion, consisting of a colloid mill of the conical colloid turbine type which had a gap with a thickness of between 0.4 and 0.6 mm between the rotor the stator.

The emulsion produced in the zone for forming an emulsion left the said zone at a temperature of 112° C. and was then maintained at 105° C. for one hour in a curing zone in which a pressure of 1.4 bars prevailed. On leaving the curing zone the emulsion was cooled to 91° C. by passing through a water-cooled heat exchanger, before leaving at atmospheric pressure.

Test 1B (Preparation of the Control Emulsion)

A bitumen/polymer component and an aqueous phase were prepared in parallel by proceeding as described in test 1A. The bitumen/polymer component obtained had a viscosity of 0.35 Pa s at 160° C.

1000 parts of the bitumen/polymer component at a temperature of 170° C. were brought into contact with 430 parts of aqueous phase at 50° C. and the whole was introduced, immediately after being brought into contact, into a zone for forming an emulsion, identical with that employed in test 1A.

The emulsion produced in the zone for forming an emulsion left the said zone at a temperature of 112° C. and was then cooled to 91° C. by passing through a water-cooled heat exchanger before being brought to atmospheric pressure.

The following two quantities were evaluated in the case of each of the emulsions of tests 1A and 1B:
- viscosity, determined according to NF standard T 66005 and expressed in seconds,
- siliceous fines breaking number, determined according to NF standard T 66017 and representing the minimum quantity, expressed in grams, of siliceous sand with a particle size of 40 to 150 $\mu$m resulting in the breaking of 100 g of emulsion with formation of a sand/bituminous binder clot.

In addition, the ring and ball softening points were determined in the case of each of the binders obtained after breaking of the emulsions from tests 1A and 1B and the maximum tensile elongation and the stress at maximum elongation were evaluated from tensile tests carried out, according to NF standard T 46002, on test pieces obtained by punching out from a sheet of the binder according to the invention, since the viscosity of the said binder resulted in its being impossible to cast, or by moulding in a silicone mould when starting with the control binder.

The results obtained are collated in Table I.

Inspection of the values recorded in Table I leads to the conclusion that the addition of a crosslinking system to the bitumen/polymer component immediately before the emulsification of the said component results, on the one hand, in the doubling of the value of the stress at 900% elongation of the binder obtained after evaporating the water from the emulsion and, on the other hand, the change in the ring and ball softening point of the said binder from 51° C. to 103° C.

TABLE I

| Nature of the emulsion | 1 A | 1 B |
|---|---|---|
| Characteristics of the emulsion: | | |
| Viscosity (s) | 36 | 29 |
| Breaking number (g) | 107 | 113 |
| Characteristics of the binder: | | |
| Ring and ball softening point (°C.): | 103 | 51 |
| Maximum tensile elongation (%)*: | >900 | >900 |
| Stress at maximum tensile elongation (bar): | 1.4 | 0.7 |

*)Tensile test carried out at 20° C. at a speed of 500 mm/minute.

EXAMPLE 2

Two emulsions of a bitumen/polymer binder were prepared, one (test 2A) by using the process according to the invention and the other (test 2B), constituting a control emulsion, by proceeding in a conventional manner.

Test 2A (Preparation of the Emulsion According to the Invention)

A bitumen/polymer component was prepared by proceeding as described in test 1A of Example 1, but using a vulcanizing system consisting of 0.7 parts of crystallized sulphur and 0.3 parts of tetramethylthiuram disulphide as vulcanization accelerator. The bitumen/polymer component obtained had a viscosity of 30 0.35 Pa s at 160° C.

4 parts of crystallized sulphur and one part of a crosslinking accelerator consisting of tetramethylthiuram disulphide were incorporated as a crosslinking system into 1000 parts of the bitumen/polymer component produced as indicated above and maintained at 170° C. and the whole was stirred at the said temperature until a homogeneous mix was obtained.

An aqueous phase was prepared in parallel as described in test 1A of Example 1.

Immediately after the formation of the homogeneous mix of the bitumen/polymer component and of the crosslinking system, 1000 parts of the said mix at a temperature of 170° C. were brought into contact with 430 parts of the aqueous phase at 50° C. and the whole was introduced, immediately after the said bringing into contact, into a zone for forming an emulsion, identical with that employed in test 1A of Example 1.

The emulsion produced in the zone for forming an emulsion left the said zone at a temperature of 112° C. and was then cooled to a temperature of 95° C. by passing through an indirect heat exchanger carrying a flow of cold water, and the emulsion cooled in this manner was then kept at between 90° C. and 95° C. for 90 to 120 minutes in a curing zone at atmospheric pressure to complete the reaction of crosslinking by sulphur which takes place inside the globules of the bitumen/polymer component and results in the formation of the bitumen/polymer binder with continuous three-dimensional polymeric structure.

Test 2B (Preparation of the Control Emulsion)

The procedure was as shown in test 1B of Example 1, but using a vulcanizing system consisting of 0.7 parts of crystallized sulphur and 0.3 parts of tetramethylthiuram disulphide to produce the bitumen/polymer component, the bitumen/polymer component obtained having a viscosity of 0.35 Pa s at 160° C.

Quantities analogous to those shown in Example 1 were determined in the case of the emulsions from tests 2A and 2B and in the case of the bitumen/polymer binders derived from the said emulsions by evaporating the water which they contain.

The results obtained are collated in Table II.

TABLE II

| Nature of the emulsion | 2 A | 2 B |
|---|---|---|
| Characteristics of the emulsion: | | |
| Viscosity (s) | 33 | 31 |
| Breaking number (g) | 105 | 111 |
| Characteristics of the binder: | | |
| Ring and ball softening point (°C.): | 97 | 50 |
| Maximum tensile elongation (%)*: | >900 | >900 |
| Stress at maximum tensile elongation (bar): | 1.12 | 0.6 |

*)Tensile test carried out at 20° C. at a speed of 500 mm/minute.

Comparison of the values which appear in Table II again leads to conclusion that the bitumen/polymer binder obtained according to the invention (addition of a sulphur-donating crosslinking system to the bitumen/polymer component immediately before the emulsification of the said component) has characteristics which are considerably improved when compared with those of the control bitumen/polymer binder. In addition, it appears that the use of the sulphur-donating crosslinking accelerator as a mixture with crystallized sulphur to constitute the crosslinking system makes it possible to obtain a bitumen/polymer binder which has characteristics that are virtually identical with those of the bitumen/polymer binder according to the invention prepared in Example 1 without having to keep the emulsion at a temperature above 100° C. in a curing zone under pressure.

EXAMPLES 3 TO 5

A series of bitumen/polymer binder emulsions according to the invention was prepared as indicated in test 2A of Example 2, but with certain changes defined below, the remaining operating conditions being those of the said test 2A.

In Example 3 the emulsifying system was made up of 2 parts of tallow propylenediamine neutralized with one part of concentrated hydrochloric acid.

In Example 4 the crosslinking system was made up of one part of a mixture containing 30% of 2-benzothiazolecyclohexylsulphenamide and 70% of crystallized sulphur, the temperature of the bitumen/polymer component and crosslinking system mix was 160° C.

and, in addition, the emulsifying system was identical in nature and quantity with that of Example 3.

In Example 5 the crosslinking system was made up of a mixture of 4 parts of a vulcanization accelerator not donating sulphur, consisting of 2-benzothiazolecyclohexylsulphenamide and 16 parts of crystallized sulphur in 80 parts of bitumen which had a penetration of 180/220, the said vulcanizing system being incorporated into the bitumen/polymer component in an in-line static mixer, after which the homogeneous mixture originating from the said mixer was brought into contact with the aqueous phase immediately before the entry into the zone for forming the emulsion.

Quantities analogous to those indicated in Example 2 were determined in the case of the emulsions from Examples 3 to 5 and in the case of the bitumen/polymer binders derived from the said emulsions by evaporating the water which they contained.

The results obtained are collated in Table III.

The said results again demonstrate the improved properties of the bitumen/polymer binders obtained by the process according to the invention.

TABLE III

| EXAMPLE | 3 | 4 | 5 |
|---|---|---|---|
| Characteristics of the emulsion: | | | |
| Viscosity (s) | 27 | 23 | 25 |
| Breaking number (g) | 90 | 85 | 95 |
| Characteristics of the binder: | | | |
| Ring and ball softening point (°C.): | 100 | 95 | 107 |
| Maximum tensile elongation (%)*): | >900 | >900 | >900 |
| Stress at maximum tensile elongation (bar): | 1.07 | 0.97 | 1.58 |

*)Tensile test carried out at 20° C. at a speed of 500 mm/minute.

EXAMPLE 6

By proceeding at 160° C. and with stirring, 1000 parts of a bitumen which had the characteristics of the bitumen employed in Example 1 were mixed with 30 parts of a diblock copolymer of styrene and butadiene identical with the copolymer employed in Example 1 until a homogeneous mass was obtained, which required 2.5 hours. A bitumen/polymer component which had a viscosity of 0.17 Pa s at 160° C. was thus obtained.

A crosslinking system consisting of 0.3 parts of a crosslinking accelerator consisting of tetramethylthiuram disulphide and 0.7 parts of crystallized sulphur was incorporated into 1000 parts of the bitumen/polymer component thus formed, maintained at 160° C., and the whole was stirred until a homogeneous mix was obtained.

An aqueous phase was prepared in parallel as described in test 1A of Example 1.

Immediately after the formation of the homogeneous mix of the bitumen/polymer component and the crosslinking system, 1000 parts of the said mix at a temperature of 160° C. were brought into contact with 430 parts of the aqueous phase at 50° C. and, immediately after the said bringing into contact, the whole was introduced into a zone for forming an emulsion, identical with that employed in test 1A of Example 1.

The emulsion produced in the zone for forming an emulsion left the said zone at a temperature of 110° C. and was then cooled and then kept in a curing zone as indicated in test 2A of Example 2.

Quantities similar to those indicated in Example 1 were determined in the case of the emulsion thus obtained and in the case of the bitumen/polymer binder derived from the said emulsion.

The results obtained are listed below.

| Characteristics of the emulsion | |
|---|---|
| Viscosity (s) | 31 |
| Breaking number (g) | 78 |
| Characteristics of the binder | |
| Ring and ball softening point (°C.) | 111 |
| Maximum tensile elongation (%)*) | >900 |
| Stress at maximum tensile elongation (bar) | 1.72 |

*)Tensile test carried out at 20° C. at a speed of 500 mm/minute.

EXAMPLE 7

Two emulsions of a bitumen/polymer binder were prepared starting with a bitumen/polymer component obtained by a master solution technique, one (test 7A) by making use of the process according to the invention and the other (test 7B), constituting a control emulsion, by proceeding in a conventional manner.

Test 7A (Preparation of the Emulsion According to the Invention)

A master solution of crystallized sulphur and of a diblock copolymer of styrene and butadiene containing 25% of styrene and having a viscometric average molecular mass of approximately 75,000 in a solvent of the hydrocarbon oil type consisting of a naphthenoaromatic petroleum cut was prepared.

The said petroleum cut exhibited an ASTM distillation initial point and final point, measured according to ASTM standard D 86-67, of 183° C. and 348° C. respectively, a flash point, measured according to NF standard T 60103, of 81° C. and a density, determined according to ASTM standard D 1657-64, of 0.258.

To prepare the master solution 200 parts of the petroleum cut were placed in a reactor and were heated to 100° C. with stirring. 2 parts of crystallized sulphur and 76 parts of the diblock copolymer were then introduced into the reactor and the whole was kept stirred at 100° C. for one hour.

A homogeneous solution of the sulphur and of the copolymer in the petroleum cut was obtained, exhibiting kinematic viscosity values at 50° C. and at 100° C. of $12.7 \times 10^{-4}$ m$^2$/s and $2.89 \times 10^{-4}$ m$^2$/s respectively.

By proceeding at 170° C. and with stirring, 1700 parts of a bitumen identical with that employed in Example 1 were mixed with 300 parts of the master solution described above. After 30 minutes' stirring at 170° C. a bitumen/polymer component was obtained which had a viscosity of 0.1Pa s at 160° C.

9 parts of crystallized sulphur previously melted at 125° C. were added as a crosslinking system to 1000 parts of the bitumen/polymer component produced as indicated above and maintained at 170° C. and the whole was stirred for one minute.

An aqueous phase was prepared in parallel as indicated in Example 3 and the homogeneous mix of the bitumen/polymer component and of crystallized sulphur was emulsified in the aqueous phase by proceeding as described in the case of the said Example 3.

Test 7B (Preparation of the Control Emulsion)

A bitumen/polymer component and an aqueous phase were prepared in parallel as indicated in test 7A and then, without adding any crosslinking system to the bitumen/polymer component, the said component was emulsified in the aqueous phase by proceeding as described in the said test 7A.

Quantities analogous to those indicated in Example 1 were determined in the case of the emulsions from tests 7A and 7B and in the case of the bitumen/polymer binders derived from the said emulsions by evaporating the water which they contained.

The results obtained are collated in Table IV.

Inspection of the said results again demonstrates a marked improvement in the characteristics of the bitumen/polymer binder obtained by the process according to the invention when compared with the characteristics of the control bitumen/polymer binder.

TABLE IV

| Nature of the emulsion | 7 A | 7 B |
|---|---|---|
| Characteristics of the emulsion: | | |
| Viscosity (s) | 25 | 28 |
| Breaking number (g) | 103 | 96 |
| Characteristics of the binder: | | |
| Ring and ball softening point (°C.): | 51 | 27 |
| Maximum tensile elongation (%)*): | >900 | >900 |
| Stress at maximum tensile elongation (bar): | 3.2 | 1.7 |

*)Tensile test carried out at −10° C. at a speed of 500 mm/minute.

We claim:

1. The process for preparing in aqueous emulsion a bitumen/polymer binder with a continuous three-dimensional polymeric structure, which comprises the steps of:

a) forming a reaction mixture in an emulsion formation zone by feeding to said zone (i) a bitumen/polymer component comprising a bitumen containing 0.5% to 15%, by weight of the bitumen, of a sulphur-crosslinkable elastomeric polymer, said bitumen/polymer component being in the form of a melt at a temperature of between 100° C. and 230° C. and having a viscosity of not more than 2 Pa.s at said temperature, (ii) an aqueous phase containing an effective quantity of an emulsifying system and having a temperature of between 10° C. and 90° C., and (iii) a crosslinking system donating sulphur in a quantity such as to provide 0.5 to 20% by weight of sulphur relative to the weight of the elastomeric polymer of the bitumen/polymer component, the weight ratio of the bitumen/polymer component to the aqueous phase ranging from 30:70 to 85:15, and b) maintaining the reaction mixture thus formed in the emulsion formation zone at a temperature between 50° C. and 160° C. until an aqueous emulsion of bitumen/polymer binder is obtained, in which the polymer of the binder is at least partially crosslinked to a three-dimensional structure.

2. The process according to claim 1 wherein the sulphur-donating crosslinking system comprises at least one composition selected from the group consisting of elemental sulphur, hydrocarbylpolysulphides, sulphur-donating vulcanization accelerators and vulcanization accelerators which do not donate sulphur.

3. The process according to claim 2, wherein first of all an intimate mixture of the bitumen/polymer component and of the sulphur-donating crosslinking system is formed at a temperature of between 100° C. and 230° C. and sufficient for the said mixture to be in the form of a melt, and then, immediately after its formation, this mixture is brought into contact with the aqueous phase and the combination is introduced, either immediately or after predispersion in a premixing zone, into the zone for forming the emulsion.

4. The process according to claim 2 wherein the emulsion originating from the zone for forming an emulsion is kept in a curing zone at a temperature of between 80° C. and 160° C. for a sufficient period for crosslinking by sulphur, which takes place within the micelles of the bitumen/polymer component in emulsion in the aqueous phase.

5. The process according to claim 4 wherein the sulphur-donating crosslinking system is free from vulcanization accelerators and the emulsion is kept in the curing zone at a temperature of between 100° C. and 160° C. for a period ranging from 15 minutes to 2 hours.

6. The process according to claim 4, characterized in that the sulphur-donating crosslinking system contains a vulcanization accelerator and in that the emulsion is kept in the curing zone at a temperature of between 80° C. and 100° C. for a period ranging from 15 minutes to 4 hours.

7. The process according to claim 6, wherein the emulsion is kept in the curing zone at a temperature between 85° C. and 95° C.

8. The process according to claim 1, wherein the temperature of the bitumen/polymer component in the form of a melt is between 120° C. and 180° C.

9. The process according to claim 1, wherein the bitumen/polymer component contains an elastomeric polymer content representing 1 to 10% by weight of the bitumen.

10. The process according to claim 1, wherein the bitumen of the bitumen/polymer component has a penetration, determined according to NF standard T 66004, of between 10 and 500.

11. The process according to claim 1 wherein the elastomeric polymer present in the bitumen/polymer component comprises a copolymer of styrene and at least one conjugated diene selected from the group consisting of butadiene, isoprene, chloroprene, carboxylated butadiene and carboxylated isoprene.

12. The process according to claim 11, wherein the copolymer of styrene and a conjugated diene has an average viscometric molecular mass of between 10,000 and 600,000.

13. The process according to claim 11, wherein the copolymer of styrene and of a conjugated diene contains 5% to 50% by weight of styrene.

14. The process according to claim 1 wherein the bitumen/polymer component results from a simple mixing of the bitumen and the elastomeric polymer.

15. The process according to claim 1 wherein the bitumen/polymer component is obtained by first mixing the elastomeric polymer with the bitumen, then incorporating into the mixture a sulphur-donating vulcanization system in an amount to provide a quantity of elemental or radial sulphur representing 0.5% to 10% of the weight of the polymer and stirring the mixture at a temperature of between 100° C. and 230° C. for a sufficient period to obtain a bitumen/polymer component in which the elastomeric polymer is coupled to the bitumen.

16. The process according to claim 14 wherein the bitumen/polymer component contains a fluxing agent in a quantity representing 1 to 40% by weight of the bitumen, the fluxing agent comprising a hydrocarbon oil exhibiting a distillation range at atmospheric pressure determined according to ASTM standard D 86-67, of between 100° C. and 450° C.

17. The process according to claim 1 wherein the bitumen/polymer component is obtained by adding to the bitumen, maintained at a temperature between 100° C. and 230° C., a master solution comprising the polymer and the sulphur-donating crosslinking system in a fluxing agent, the fluxing agent comprising a hydrocarbon oil exhibiting a distillation range at atmospheric pressure, determined according to ASTM standard D 86-67, of between 100° C. and 450° C. and [by keeping]-stirring the resulting mixture at a temperature of between 100° C. and 230° C. for a sufficient period to obtain a fluid product, the quantity of crosslinking system present in the master solution being such as to provide an amount of sulphur representing 0.5 to 10% of the weight of the polymer present in the master solution.

18. The process according to claim 15 wherein the sulphur-donating vulcanizing system comprises at least one member selected from the group consisting of elemental sulphur, hydrocarbyl polysulphides, sulphur-donating vulcanization accelerators and vulcanization accelerators which do not donate sulphur.

19. The process according to claim 1 wherein the sulphur-donating crosslinking system is employed in a quantity of 1% to 15% by weight of sulphur relative to the weight of the elastomeric polymer in the bitumen/polymer component.

20. The process of claim 1 wherein in the formation of the emulsion the weight ratio of the bitumen/polymer component to the aqueous phase is from 50:50 to 80:20.

21. The process of claim 1 wherein the temperature of the aqueous phase introduced into the zone for forming an emulsion is between 20° C. and 80° C.

22. The process according to claim 1 to wherein the aqueous phase contains a quantity of emulsifying system representing 0.005% to 3% of the total weight of emulsion.

23. The process according to claim 1 wherein the emulsifying system present in the aqueous phase comprises at least one cationic emulsifying agent.

24. The process according to claim 1 wherein the emulsifying system present in the aqueous phase comprises at least one anionic emulsifying agent.

25. The process according to claim 1 wherein the emulsifying system present in the aqueous phase comprises at least one nonionic emulsifying agent.

26. The process according to claim 23 wherein the pH of the aqueous phase is adjusted to a value of between 1 and 7 by addition of an acid.

27. The process according to claim 1 wherein, in addition to the emulsifying system and optionally, a pH regulating agent, the aqueous phase contains salts, adhesion promoters and thickening agents.

28. The process according to claim 1 wherein the bitumen/polymer component contains at least one adhesion promoter for the bitumen/polymer binder.

29. The process according to claim 3, wherein the temperature is between 120° C. and 180° C.

30. The process according to claim 10, wherein the penetration is between 20 and 400.

31. The process according to claim 12, wherein the average viscometric molecular mass is between 30,000 and 400,000.

32. The process according to claim 15, wherein the quantity of elemental or radical sulfur represents 1% to 8% of the polymer employed.

33. The process according to claim 16, wherein the flexing agent is present in a quantity representing 2 to 20% by weight of the bitumen and wherein the distillation range is between 150° C. and 380° C.

34. The process according to claim 17, wherein the distillation temperature is between 150° C. and 380° C.

35. The process according to claim 22, wherein the emulsifying system represents 0.01% to 2% of the total weight of the emulsion.

36. The process according to claim 27, wherein the salts are sodium chloride or calcium chloride.

37. The process according to claim 27, wherein the thickening agent is scleroglucan.

38. The process for coating at least a portion of a road surface which comprises contacting said road surface with the aqueous emulsion of a bitumen/polymer binder obtained by the process of claim 1 wherein the polymer of the binder is a block copolymer of styrene and a conjugated diene selected for the group consisting of butadiene, isoprene, chloroprene, carboxylated butadiene and carboxylated isoprene, said block copolymer containing 5% to 50% by weight of styrene.

39. The process of claim 28 wherein the adhesion promotor comprises at least one nitrogen containing composition.

40. The process of claim 39 wherein the nitrogen composition is amine or an amide.

41. The process of claim 28 wherein the adhesion promoter is grafted onto the bitumen/polymer component.

42. The process of claim 23 wherein the cationic emulsifying agent comprises a nitrogenous cationic emulsifying agent.

43. The process according to claim 1, wherein the reaction mixture also contains at least one vulcanization accelerator which does not donate sulphur.

44. The process according to claim 18, wherein the reaction mixture also contains at least one vulcanization accelerator which does not donate sulphur.

* * * * *